UNITED STATES PATENT OFFICE.

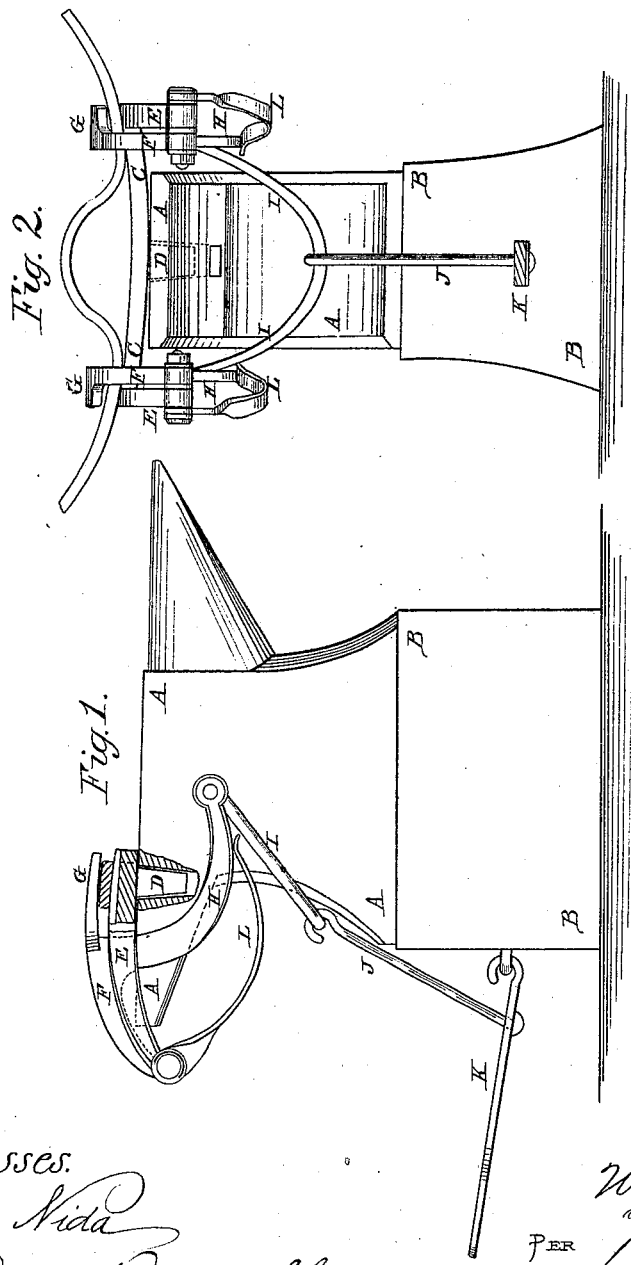

N. P. QUICK, OF CARMEL, NEW YORK.

IMPROVED SMITH'S ANVIL-CLAMP FOR HOLDING TIRES WHILE BEING UPSET BY HAND-FORGING.

Specification forming part of Letters Patent No. 92,881, dated July 20, 1869.

*To all whom it may concern:*

Be it known that I, N. P. QUICK, of Carmel, in the county of Putnam and State of New York, have invented a new and Improved Tire-Clamp; and I do hereby declare that the following is a full, clear, and exact description thereof, which will enable others skilled in the art to make and use the same, reference being had to the accompanying drawings, forming part of this specification, in which—

Figure 1 is a side view of my improved device as attached to an anvil, parts being broken away to show the construction. Fig. 2 is a rear end view of the same.

Similar letters of reference indicate corresponding parts.

My invention has for its object to furnish an improved tire-clamp which shall be so constructed and arranged that it may be readily attached to the rear part of the anvil, and easily detached when no longer required for use, and which shall at the same time be simple in construction and effective in operation; and it consists in the construction of the device, as hereinafter more fully described.

A represents the anvil, and B the anvil-block, about the construction of which parts there is nothing new.

C is the bed-plate of the upsetter, which is made slightly curved, to correspond somewhat with the curve of the tire to be upset.

To the center of the under side of the plate C is attached, or upon it is formed, a square arm or tenon, D, which fits into the square hole in the rear part of the face of the anvil A, as shown in Figs. 1 and 2, to securely connect the upsetter with said anvil.

Upon the ends of the plate C are formed, or to them are attached, two rearwardly-projecting arms, E, to the rear ends of which are pivoted the rear ends of the arms F. Upon the forward ends of the arms F are attached jaws G, by means of which the tire to be upset is clamped to the plate C.

To the arms F are attached arms H, projecting downward and forward, and to the forward ends of which are pivoted the ends of the bail or curved bar I.

J is a connecting-rod the upper end of which hooks upon the bail I, and the lower end of which is connected with the treadle K.

The inner end of the treadle K has a hook formed upon it, which hooks upon a staple or other catch attached to the anvil-block B, which thus forms the fulcrum of the treadle. By this construction, by bearing down upon the free end of the treadle K with the foot, the tire to be upset will be clamped between the jaws G and plate C.

L are springs, the outer ends of which are rigidly connected with the rear ends of the arms E, and the forward ends of which rest and press against the under side of the forward parts of the arms H, as shown in Figs. 1 and 2, to raise the jaws G and release the tire as soon as the pressure has been removed from the treadle K.

In using the device the part of the tire to be operated upon is first bent inward over the horn of the anvil, to form a loop or bend in said tire. The tire is then adjusted upon the plate C, with the said loop or bend about midway between the jaws G, and is securely clamped between the said jaws G and the said plate C by bearing down upon the treadle K with the foot. The loop or bend is then hammered out of the tire by hammering it down to the plate, which contracts or shortens the tire. When not required for use, the upsetting device is detached from the anvil and laid aside until again required.

This device requires but little space, either when in use or when not in use, and when in use is close to the forge, and can thus be conveniently used.

Having thus described my invention, I claim as new and desire to secure by Letters Patent—

1. An improved tire-clamp for attachment to anvils, formed by the combination of the plate C, arm D, arms F, jaws G, arms H, bail or connecting-bar I, connecting-bar J, treadle K, and springs L with each other, substantially as herein shown and described, and for the purpose set forth.

2. The combination of the tire-clamp with the anvil A and block B, when arranged as herein shown and described.

N. P. QUICK.

Witnesses:
 JOHN G. MILLER,
 CHAS. SPRAGUE.